July 6, 1926.  1,591,536

J. LAKE, JR

TANDEM ATTACHMENT

Filed April 1, 1926  2 Sheets-Sheet 1

INVENTOR
James Lake, Jr.
BY
Philip S. McLean
ATTORNEY

July 6, 1926.

J. LAKE, JR 1,591,536

TANDEM ATTACHMENT

Filed April 1, 1926     2 Sheets-Sheet 2

INVENTOR
James Lake, Jr.
BY
Philip S. McLean
ATTORNEY

Patented July 6, 1926.

1,591,536

UNITED STATES PATENT OFFICE.

JAMES LAKE, JR., OF BROOKLYN, NEW YORK.

TANDEM ATTACHMENT.

Application filed April 1, 1926. Serial No. 98,953.

This invention relates to tandem attachments for motorcycles.

The objects of this invention are to provide a light, strong tandem which will be so braced as to withstand the vibration to which it is subjected and which by reason of such bracing can be made up of relatively light and inexpensive flat metal strips.

Additional special objects of the invention are to construct the frame of the tandem so that it will stand up of itself and not collapse when removed from the motorcycle, which will be self-braced, not depending on the motorcycle for its proper bracing and which actually will strengthen the motorcycle frame when applied thereto instead of weakening or imposing unusual strains upon the same.

The foregoing and other desirable objects are attained by special novel features of construction, combinations and relations of parts as described in the following specification and broadly claimed.

The drawings accompanying and forming part of this specification illustrate one of the practical embodiments of the invention but it should be understood that changes and modifications may be made therein without departure from the broad spirit and true scope of the invention.

Figure 2 is a side elevation of the tandem attached and in place on the motorcycle.

Figure 3 is an enlarged broken detail of the pedal construction and related parts.

Figure 1:
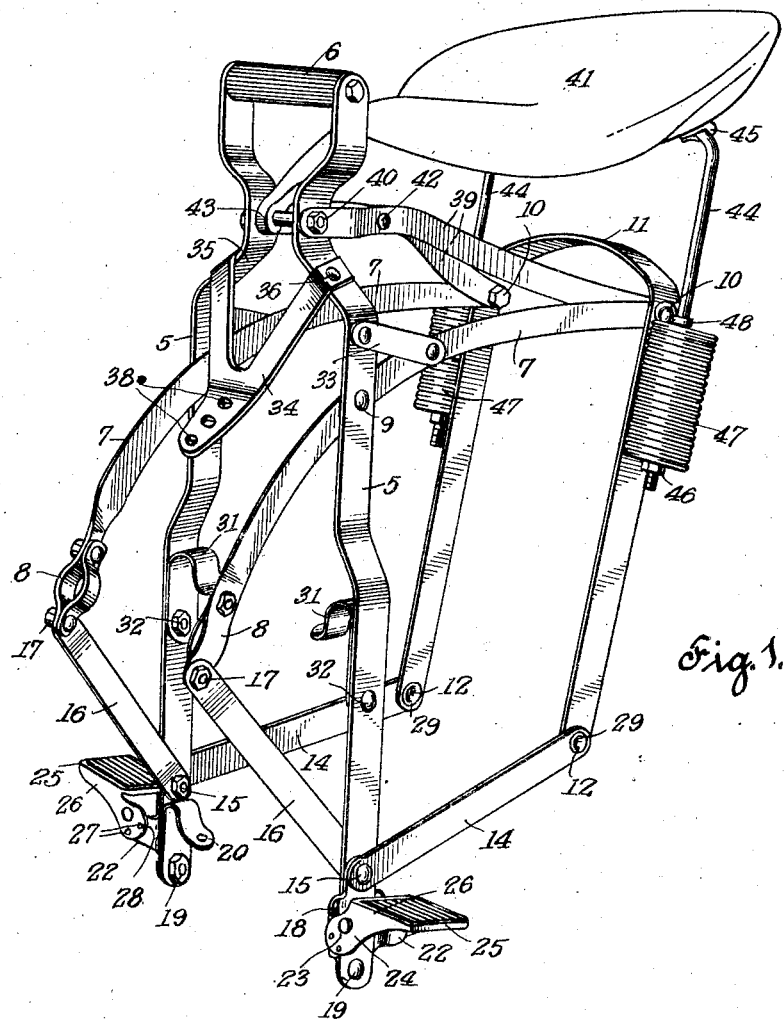
Figure 1 is a perspective view of the tandem complete and ready for attachment to a motorcycle.

The frame of the tandem is made up in the illustration of the two uprights 5 connected in spaced relation at the top by handle 6, the two curved side bars 7 provided at their forward ends with angled clamps 8 for engagement with the upper frame bars of the motorcycle, said side bars being connected intermediate their ends at 9 with the uprights and at their rearward ends at 10 with the sides of a yoke 11. The lower ends of this yoke are pierced at 12 for engagement by the bolts 13 on the rear fork of the motorcycle and are connected by side straps 14 with the lower ends of the uprights. The bolts 15 which secure the forward ends of these straps to the uprights also serve to fasten the lower ends of the upwardly angled straps 16 which are secured at their upper ends to the forward ends of the curved side bars by the forward bolts 17 of the clamps 8.

The bolts 15 may be the same bolts which secure the upper ends of the pedal brackets 18 to the lower ends of the uprights. Additional bolts 19 secure the lower ends of these brackets in place and also serve to secure the clamp straps 20 about the lower frame bars 21 of the motorcycle frame.

The pedal brackets 18 are shown as formed of sheet metal with outwardly turned lugs or ears 22 carrying the bolts 23 forming pivotal supports for the downwardly angled sides 24 of the pedals 25. The tops of the lugs 22, by engagement with the under sides of the pedals at 26, support the pedals in use and the cooperating protuberances 27 and sockets 28 on the pedal lugs and bracket lugs respectively serve to hold the pedals either folded up out of the way or in the outstanding position of use.

The straps 14 may be made as continuations or extensions of the lower ends of the yoke and may, for example, be permanently connected therewith as by means of headed bushings or tubular rivets 29.

The intermediate portions of the uprights 5 are shown as braced by being rigidly secured to the upper frame bars 30 of the machine by encircling clamp straps 31 secured by bolts 32.

The upper ends of the uprights are braced by being secured to the curved side bars by the rearwardly and downwardly angled links 33 and by means of a forked strap 34 whose branches are secured to the inwardly shouldered portions 35 of the uprights at 36 and which is secured at its forward end to the mudguard 37 at 38.

The upper portion of the uprights is further braced in the present disclosure by straps 39 connected at the front with the pivot stud 40 of the saddle 41 and at the rear with the yoke bolts 10. These straps 39 are shown as curved inwardly beneath the forward part of the saddle so as to be entirely out of the way of the rider and these inwardly bent portions are shown as secured together at 42. This produces the effect of a unitary brace forked at its forward end to engage the ends of the saddle bolt 40 and forked more widely at its rearward end to engage the yoke bolts 10.

The saddle has a pivotal engagement at its forward end on a stud bolt 40 at 43 and at its rearward end the saddle is yieldingly supported by a yoke 44 pivoted at the upper end at 45 to the under side of the saddle and having its lower ends secured at 46 to the springs 47. These springs are shown as supported from the yoke bolts 10 and the up and down movements of the saddle arch 44 are shown as controlled by guide brackets 48 also carried by these bolts and encircling the side rods of the saddle arch 44.

The construction of the tandem as described enables the use of relative light strap metal for practically all parts of the tandem frame so that in the end the structure may actually be lighter than present tandem attachments, more rigid, non-vibrating and better able to withstand road shocks or collision forces.

What is claimed is:

1. A tandem attachment for motorcycles comprising a frame composed of uprights, side bars provided with means at their forward ends for connection with the motorcycle frame and connected intermediate their ends with the uprights, a yoke connected at the upper end with the rearward ends of the side bars and provided with means at the lower ends of the same, enabling attachment to the motorcycle frame, pedals carried by the lower ends of the uprights and braces for said pedals extending from the lower ends of the yoke to the lower ends of said uprights.

2. A tandem attachment for motorcycles comprising a frame composed of uprights, side bars provided with means at their forward ends for connection with the motorcycle frame and connected intermediate their ends with the uprights, a yoke connected at the upper end with the rearward ends of the side bars and provided with means at the lower ends of the same, enabling attachment to the motorcycle frame, pedals carried by the lower ends of the uprights, braces for said pedals extending from the lower ends of the yoke to the lower ends of said uprights and bolts securing said pedals to the uprights, said bolts also fastening the forward ends of the braces in connection with the lower ends of the uprights.

3. A tandem attachment for motorcycles comprising a frame composed of uprights, side bars provided with means at their forward ends for connection with the motorcycle frame and connected intermediate their ends with the uprights, a yoke connected at the upper end with the rearward ends of the side bars and provided with means at the lower ends of the same, enabling attachments to the motorcycle frame, pedals carried by the lower ends of the uprights, braces for said pedals extending from the lower ends of the yoke to the lower ends of said uprights and upwardly angled braces extending from the lower ends of the uprights to the forward ends of the side bars.

4. A tandem attachment for motorcycles comprising a frame composed of uprights, side bars provided with means at their forward ends for connection with the motorcycle frame and connected intermediate their ends with the uprights, a yoke connected at the upper end with the rearward ends of the side bars and provided with means at the lower ends of the same, enabling attachment to the motorcycle frame, pedals carried by the lower ends of the uprights, braces for said pedals extending from the lower ends of the yoke to the lower ends of said uprights and braces extending rearwardly from the upper portions of the uprights to the side bars of the frame.

5. A tandem attachment for motorcycles comprising a frame composed of uprights, side bars provided with means at their forward ends for connection with the motorcycle frame and connected intermediate their ends with the uprights, a yoke connected at the upper end with the rearward ends of the side bars and provided with means at the lower ends of the same, enabling attachment to the motorcycle frame, pedals carried by the lower ends of the uprights and braces for said pedals extending from the lower ends of the yoke to the lower ends of said uprights and bracing means extending forwardly from the upper portion of the uprights and provided with means enabling attachment of the same to the motorcycle.

6. A tandem attachment for motorcycles comprising a frame composed of uprights, side bars provided with means at their forward ends for connection with the motorcycle frame and connected intermediate their ends with the uprights, a yoke connected at the upper end with the rearward ends of the side bars and provided with means at the lower ends of the same, enabling attachment to the motorcycle frame, pedals carried by the lower ends of the uprights, braces for said pedals extending from the lower ends of the yoke to the lower ends of said uprights and means for enabling connection of intermediate portions of the uprights to the upper frame bars of the motorcycle.

7. A tandem attachment for motorcycles comprising a frame composed of uprights, side bars provided with means at their forward ends for connection with the motorcycle frame and connected intermediate their ends with the uprights, a yoke connected at the upper end with the rearward ends of the side bars and provided with means at the lower ends of the same, enabling attachment to the motorcycle frame, pedals carried by the lower ends of the uprights, braces for said pedals extending from the lower ends of the yoke to the lower ends of said uprights and means for securing the lower ends of the uprights to the lower frame bars of the motorcycle frame.

8. A motorcycle tandem attachment comprising uprights, a yoke provided with means at the lower ends of the same for enabling attachment to the rear fork of a motorcycle, connections extending rearwardly from the upper portion of said uprights to the upper portion of the yoke, a saddle pivotally supported at its forward end by said uprights and yieldingly supported at its rearward end by said yoke, means extending forwardly from the upper portion of said uprights for connection with the motorcycle, pedals carried by the lower ends of said uprights and bracing means for said pedal carrying portions of the uprights extending from the lower ends of the yoke forwardly to the lower ends of said uprights.

9. A motorcycle tandem attachment comprising uprights, a yoke provided with means at the lower ends of the same for enabling attachment to the rear fork of a motorcycle, connections extending rearwardly from the upper portion of said uprights to the upper portion of the yoke, a saddle pivotally supported at its forward end by said uprights and yieldingly supported at its rearward end by said yoke, means extending forwardly from the upper portion of said uprights for connection with the motorcycle, pedals carried by the lower ends of said uprights and guides for confining the yielding up and down movements of the saddle.

In witness whereof, I have hereunto set my hand this 26th day of January, 1926.

JAMES LAKE, Jr.